(12) United States Patent
Grudzinski

(10) Patent No.: US 10,973,214 B2
(45) Date of Patent: Apr. 13, 2021

(54) GIG WITH MULTIPLE SPEAR HEAD ASSEMBLIES ATTACHED TO A STRINGER

(71) Applicant: Justin Grudzinski, Dallas, TX (US)

(72) Inventor: Justin Grudzinski, Dallas, TX (US)

(*) Notice: Subject to any disclaimer, the term of this patent is extended or adjusted under 35 U.S.C. 154(b) by 321 days.

(21) Appl. No.: 16/218,799

(22) Filed: Dec. 13, 2018

(65) Prior Publication Data

US 2020/0187470 A1 Jun. 18, 2020

(51) Int. Cl.
*A01K 81/04* (2006.01)
*A01K 65/00* (2006.01)

(52) U.S. Cl.
CPC .............. *A01K 81/04* (2013.01); *A01K 65/00* (2013.01)

(58) Field of Classification Search
CPC ................. A01K 81/04; A01K 65/00
USPC ................................................. 43/6
See application file for complete search history.

(56) References Cited

U.S. PATENT DOCUMENTS

| | | | | |
|---|---|---|---|---|
| 1,975,864 A * | 10/1934 | Plasters | ............... | A01K 65/00 224/103 |
| 2,708,860 A * | 5/1955 | Arpin | ............... | F41B 13/10 89/1.34 |
| 2,745,204 A * | 5/1956 | Myers | ............... | F42B 30/14 43/6 |
| 3,071,401 A * | 1/1963 | Maierhofer | ............ | A01K 97/14 294/61 |
| 3,227,454 A * | 1/1966 | Ellenburg | ............... | F42B 6/04 473/586 |
| 3,444,642 A * | 5/1969 | Mastropolo | ............... | F41B 7/04 43/6 |
| 4,570,836 A * | 2/1986 | Mayo | ............... | A01K 65/00 224/103 |
| 5,243,778 A * | 9/1993 | Henley | ............... | A01K 81/04 43/6 |
| 8,387,602 B1 * | 3/2013 | Bruington | ............... | A01K 81/00 124/20.3 |
| 9,220,246 B1 * | 12/2015 | Roman | ............... | A01K 81/06 |
| 9,668,462 B1 * | 6/2017 | Mayo | ............... | A01K 65/00 |
| 2008/0263931 A1 * | 10/2008 | Butler | ............... | A01K 81/04 43/6 |
| 2008/0263932 A1 * | 10/2008 | Butler | ............... | A01K 81/04 43/6 |
| 2014/0115945 A1 * | 5/2014 | Niki | ............... | A01K 81/04 43/6 |
| 2019/0069530 A1 * | 3/2019 | Marshall | ............... | A01K 81/04 |
| 2019/0335730 A1 * | 11/2019 | McPherson | ............... | F42B 6/06 |
| 2020/0022345 A1 * | 1/2020 | Sullivan | ............... | F16F 1/06 |

FOREIGN PATENT DOCUMENTS

GB 2152341 A * 8/1985 ............. A01K 91/18

* cited by examiner

*Primary Examiner* — Christopher P Ellis
(74) *Attorney, Agent, or Firm* — Sheri Higgins; Sheri Higgins Law, PLLC

(57) ABSTRACT

A gig comprises a shaft; a spear head assembly comprising: a spear shaft; one or more spear prongs located at a first end of the spear shaft; and a ring, wherein the ring is secured to the spear shaft; and a stringer, wherein the stringer is removably or slidably connected to the ring. There can be more than one spear head assembly that can be used to spear more than one fish. Each of the spear head assemblies can be connected to the stringer via the rings whereby the fish can remain in the water until such time as it is desired to remove the fish. At that point, a person can simply draw the stringer towards them in order to retrieve the fish.

20 Claims, 4 Drawing Sheets

GIG WITH MULTIPLE SPEAR HEAD ASSEMBLIES ATTACHED TO A STRINGER

TECHNICAL FIELD

Gigging is a popular past-time activity whereby a person uses a gig to spear fish or amphibians. The gig generally has a long shaft and a spear head assembly for spearing the fish. Once speared, the fish can remain in the water or retrieved by the person.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Gigging is a popular activity among many people. Gigging involves using a gig to spear fish, amphibians, or small game. By way of example, gigging fish generally involves a person standing or wading in water. When a fish is spotted lying on the floor of the body of water, the person stabs the gig towards the fish in hopes of penetrating the fish with a spear head assembly of the gig. If the spear head assembly penetrates the fish, the fish generally has to be removed from the water by the person lifting up on the gig shaft and/or spear head assembly. The spear head assembly can then be removed from the fish, and the fish can then be stored, for example, in an ice chest. Alternatively, the fish and spear head assembly can be secured to a stringer and placed in the water until the person is finished gigging.

Several disadvantages exist to current gigs. First, the person must either bend down or lift the gig shaft out of the water in order to retrieve the fish. Second, if the person desires to leave the fish in the water until finished gigging, then the person must generally tether the gigged fish to a stringer or other type of rope and place the fish back in the water after tethering. Third, tethering multiple fish on the same stringer is difficult at best. The above-mentioned disadvantages are time consuming and unnecessarily add to the complexities of gigging.

Thus, there is a need for a gig that solves all of the disadvantages of traditional gigs. It has been discovered that a gig can be made wherein a spear head assembly can be inserted into a shaft. The spear head assembly can include a ring for receiving a stringer. A person can secure the stringer to the shaft in order to maintain insertion of the spear head assembly. After a fish is speared, the person can release the stringer from the shaft, thus disengaging the spear head assembly from the shaft. In this manner, the spear head assembly and fish can move down the stringer in the water to the end of the stringer.

According to certain embodiments, a gig comprises: a shaft; a spear head assembly comprising: a spear shaft; one or more spear prongs located at a first end of the spear shaft; and a ring, wherein the ring is secured to the spear shaft; and a stringer, wherein the stringer is removably or slidably connected to the ring.

It is to be understood that the discussion of the various embodiments is meant to apply to all of the apparatuses and methods without the need to continually refer to each embodiment for all of the apparatuses and methods.

Figure 1:
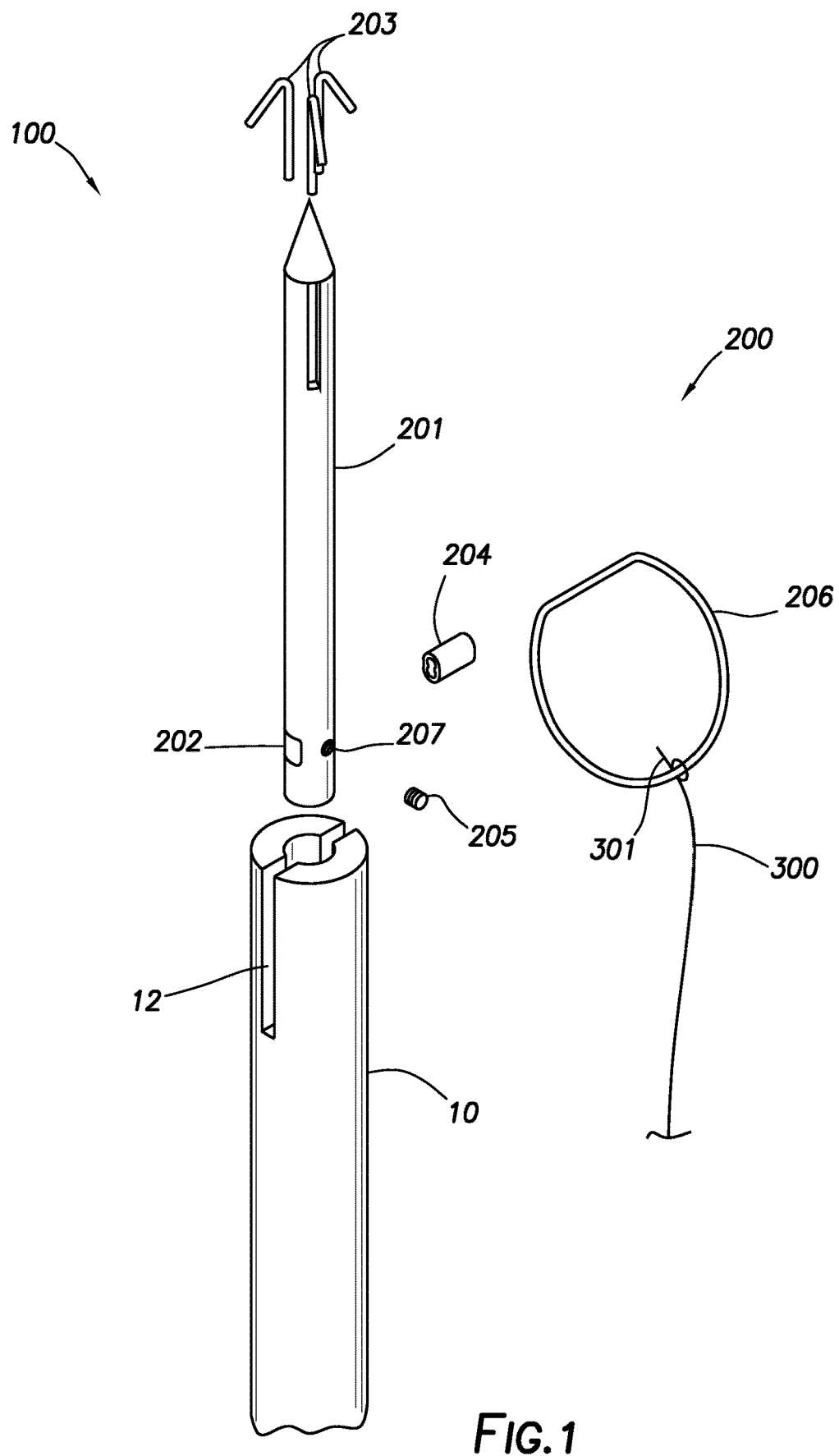
FIG. 1 is a perspective view of a disassembled gig according to certain embodiments.

Turning to the figures, FIG. 1 shows a portion of the gig 100 according to certain embodiments. The gig 100 can include a shaft 10. The gig 100 can also include a spear head assembly 200 comprising a spear shaft 201, one or more spear prongs 203 located at a first end of the spear shaft 201, and a ring 206, wherein the ring 206 is secured to the spear shaft 201. The ring 206 can be permanently or removably secured to the spear shaft 201.

The spear prongs 203 can be permanently secured to the first end of the spear shaft 201. According to certain embodiments, the spear head assembly 200 includes two or more spear prongs 203. The spear prongs 203 can be angled up at an angle ranging from about 40° to about 65° from a longitudinal axis of the spear shaft 201. In this manner, the spear prongs 203 can travel through a portion of a fish or amphibian and prevent the fish or amphibian from slipping off the spear head assembly 200.

Figure 2:
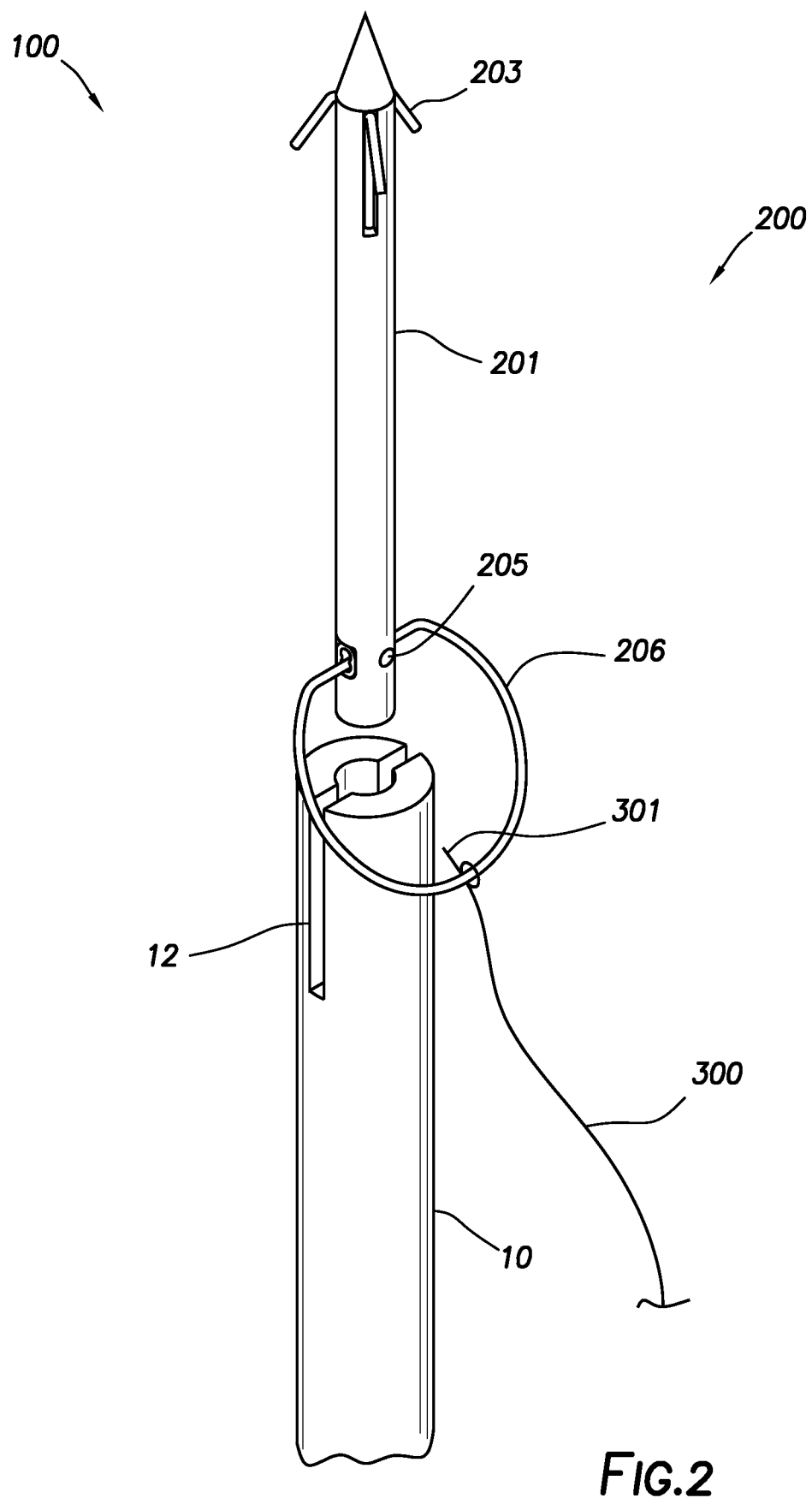
FIG. 2 is a perspective view of the gig with the spear head assembly removed from the shaft.
Figure 3:
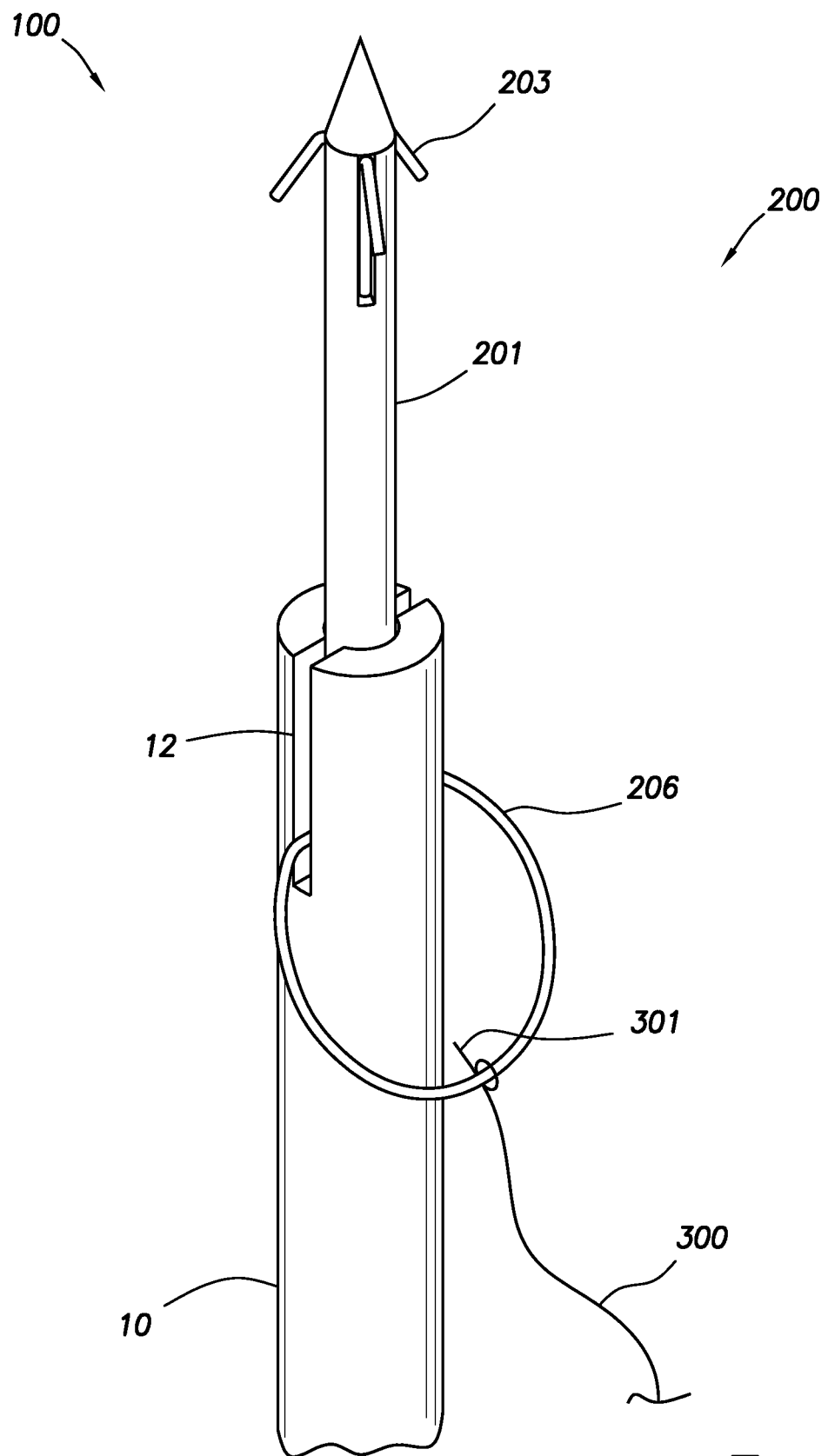
FIG. 3 is a perspective view of the gig with the spear head assembly inserted into the shaft according to certain embodiments.

The shaft 10 can include a slot 12 for removably receiving a second end of the spear shaft 201, wherein the first end and the second end of the spear shaft 201 are located opposite each other. FIG. 2 shows the spear head assembly 200 not inserted into the shaft 10, while FIG. 3 shows the spear head assembly 200 inserted into the shaft 10. According to certain embodiments, the geometry and dimensions of the slot 12 are selected such that the second end of the spear shaft 201 is capable of being inserted into the slot 12. The dimensions of the slot 12 can be selected such that the second end of the spear shaft 201 can be inserted into the slot 12 and provide a snug fit within the slot 12. The depth of the slot 12 can also be selected such that there is little to no movement of the spear shaft 201 once inserted into the slot 12 at an angle perpendicular to a longitudinal axis of the spear shaft 201. In this manner, the gig 100 is more secure and easier to use. By way of an example, the depth of the slot 12 can range from about 2 inches (in) to about 8 in.

The ring 206 is secured to the spear shaft 201. The spear shaft 201 can include a first opening 202 that traverses an entire width of the spear shaft, and wherein the ring 206 is positioned within the first opening 202 for securing the ring 206 to the spear shaft 201. The ring 206 can be made from a flexible, semi-rigid, or rigid material selected from metals, metal alloys, or plastics. First and second ends of the ring 206 can be secured to each other, for example, by spot welding or gluing the ends together. According to certain other embodiments, the ends of the ring 206 can be crimped together to secure the ends to each other. According to this embodiment and as shown in FIGS. 1 and 2, the first opening 202 can further include a crimp 204 for crimping a first end and a second end of the ring together. The first end and second ends of the ring 206 can be fed into the crimp 204. The crimp 204 can then be tightened to crimp the ends together. This embodiment can be useful when the ring 206 is made from a flexible metal or metal alloy.

The spear shaft 201 can further include a second opening 207 located perpendicular to the first opening 202, and wherein the second opening traverses the spear shaft to conjoin with the first opening. The second opening 207 can receive a fastener 205 for securing the ring 206 to the spear shaft 201. The fastener 205 can be any type of fastener, such as a screw or a pin, for securing the ring 206 to the spear shaft 201.

Figure 4:
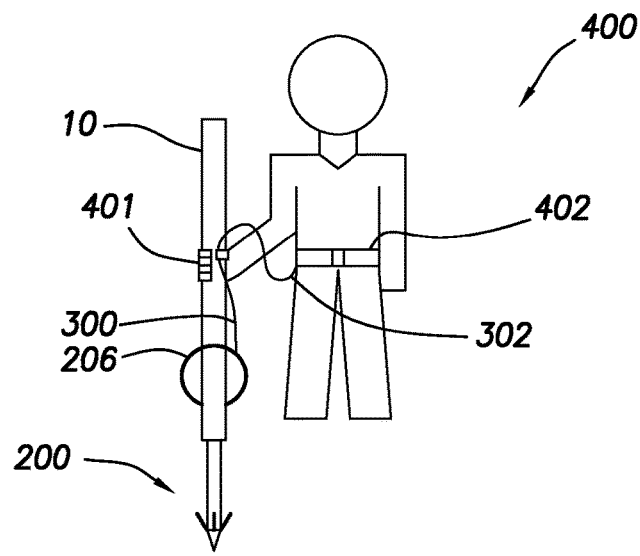
FIG. 4 is a perspective view of the gig being held by a person during gigging.

The gig 100 also includes a stringer 300 that is removably or slidably connected to the ring 206. FIG. 1 depicts a first spear head assembly 200. According to this embodiment, a first end 301 of the stringer 300 is removably secured to a first ring 206 of the first spear head assembly 200. The first end 301 of the stringer 300 can be secured to the first ring 206, for example, by tying the first end 301 of the stringer 300 to the first ring 206. In practice and as shown in FIG. 4, the spear head assembly 200 can be inserted into the slot 12 of the shaft 10 and the spear head assembly 200 can be temporarily secured to the shaft 10 by a person 400 holding onto the stringer 300 with a hand 401 surrounding the stringer and the shaft and maintaining upward pull on the stringer 300. It is to be understood that upward pull means in a direction opposite from the first end of the spear head assembly 200 where the spear prongs 203 are located. In this manner, the spear head assembly 200 is prevented from slipping out of connection with the shaft 10 due to movement or the force of gravity.

The dimensions and shape of the gig 100 can vary. According to certain embodiments, the shaft 10 and spear shaft 201 have a cross-sectional shape selected from circular, square, rectangular, or triangular. The combined length of the shaft 10 and the spear shaft 201 can vary and can be selected based upon an age bracket of a user. For example, a gig designed to be used by children may have a combined length ranging from about 2.5 feet (ft) to about 4 ft; whereas a gig designed to be used by adults can have a combined length ranging from about 4 ft to about 8 ft. The spear shaft 201 can have a fixed length, whereas the shaft 10 may be sold in varying lengths. According to certain embodiments, the combined length is selected such that a user can easily use the gig to spear fish or amphibians. The outer diameter or perimeter of the shaft 10 can also vary and may have smaller dimensions for a gig intended for use by children versus a gig intended for use by adults. For example, for use by children, the outer diameter or perimeter can range from about 0.5 in to about 1.5 in; whereas for use by adults, the outer diameter or perimeter can range from about 0.5 in to about 2 in.

The shaft 10, spear shaft 201, and the one or more spear prongs 203 can be made from a variety of materials. According to certain embodiments, the material is a rigid material. Examples of suitable rigid materials include, but are not limited to, a metal, a metal alloy, or a rigid plastic. If the material is selected from a metal or metal alloy, then preferably the material is a light-weight metal or metal alloy. In this manner, the gig 100 is light weight enough to use and hold for long periods of time. Examples of light-weight metals and metal alloys include, but are not limited to, aluminum, magnesium, titanium, aluminum alloys, steel, stainless steel, and beryllium alloys.

Figure 5:
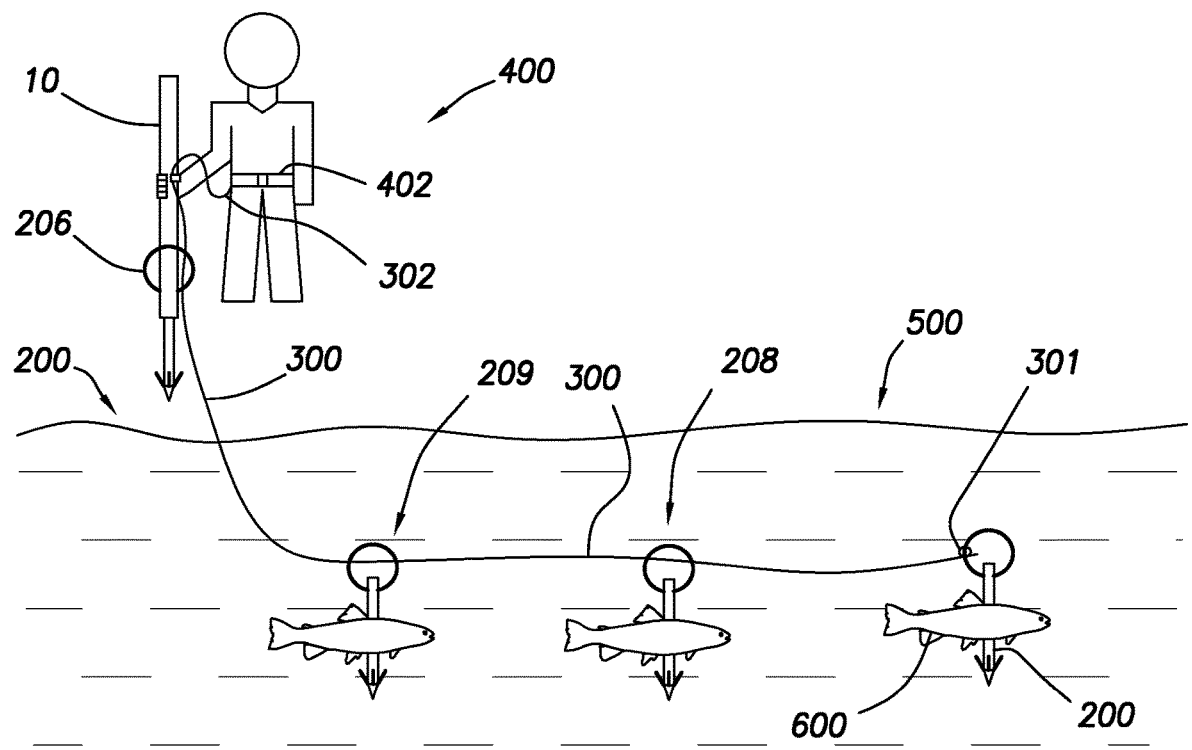
FIG. 5 is a perspective view of multiple fish being secured to individual spear head assemblies and tethered to a stringer.

As shown in FIG. 5, the gig 100 can further include at least a second spear head assembly 208, and wherein the at least second spear head assembly comprises a second ring, and wherein the stringer 300 is slidably connected to the second ring. The gig 100 can also include a plurality of additional spear head assemblies. For example, a third spear head assembly 209, a fourth (not shown), and so on. The number of additional spear head assemblies can vary and can range from about 3 to about 12. Each of the additional spear head assemblies can be slidably connected to the stringer 300 via the respective rings on the additional spear head assemblies. As also shown in FIGS. 4 and 5, a second end of the stringer 302 can be removably secured to an anchor. The anchor can be any object that is capable of preventing the stringer 300 from floating away in water. By way of example, the anchor can be a belt 402 worn by a person 400. By way of another example, the second end of the stringer 302 can be tied around a rock, ice chest, tree, or other heavy, fixed object. When the person 400 has finished gigging, the person can simply untie the second end of the stringer 302 from the anchor.

According to certain other embodiments, a method for gigging comprises: inserting a second end of a spear shaft 201 of a spear head assembly 200 into a slot 12 of a shaft 10, wherein the spear head assembly comprises: the spear shaft; one or more spear prongs 203 located at a first end of the spear shaft; and a ring 206, wherein the ring is secured to the spear shaft; removably or slidably connecting a stringer 300 to the ring; providing upward pull on the stringer to maintain the spear head assembly within the slot of the shaft; thrusting the shaft and spear head assembly towards a fish 600 or amphibian; releasing the upward pull on the stringer whereby the spear head assembly detaches from the shaft; and allowing the spear head assembly to move within a body of water.

As shown in FIGS. 4 and 5, a person 400 can begin gigging by securing a first end of the stringer 301, for example by tying, to a first ring 206 of a first spear head assembly 200. The spear shaft 201 can then be inserted into the slot 12 of the shaft 10 whereby the person 400 maintains insertion of the spear shaft 201 into the shaft 10 by providing upward pull on the stringer 300 with a hand 401. Once the stringer 300 is pulled taught, the person 400 can maintain the tension on the stringer 300 by grasping the shaft 10 with the stringer inside the hand. The person 400 can then spear a fish or amphibian with the spear head. If successful, the person 400 can release the tension on the stringer 300 to allow the spear head assembly 200 to move within a body of water 500.

After the first fish 600 or amphibian is speared, the person 400 can then insert and secure a second spear head assembly 208 into the slot 12 of the shaft 10 and repeat the process. The ring of the second spear head assembly 208 (and any other additional spear head assemblies) is slidably connected to the stringer 300. In this manner, after the upward pull of the on the stringer is released, the second spear head assembly 208 can move along the stringer 300 within the body of water 500 towards the first spear head assembly 200. This process can be repeated with as many spear head assemblies as the person 400 has. The additional spear head assemblies will not float away in the water because they will be stopped by the first spear head assembly.

When the person is finished gigging, the person can simply pull the stringer, with all the spear head assemblies secured to the stringer, towards the person until all of the spear head assemblies are removed from the water. This aspect has the advantage of alleviating the need for the person to have to bend over to retrieve the fish or amphibians from the water. Each of the spear head assemblies can then be removed from the fish or amphibian by pushing and/or pulling the spear head assemblies through the fish or amphibian in a direction opposite of the incline of the spear prongs 203. For rings made from a flexible material, the ring will flex as the ring passes through the fish or amphibian's body and thus, cause little damage to the flesh of the fish or amphibian. In some embodiments, when the rings are made from a rigid to semi-rigid material, the formed rings preferably have a diameter less than or equal to 1 in to cause the least amount of damage to the flesh of the fish or amphibian as possible.

After all the fish or amphibians are removed from the spear head assemblies, the first end of the stringer 301 can be removed from the first ring and the second end of the stringer 302 can be removed from the anchor, for example, by untying the ends. Each of the additional spear head assemblies (i.e., the second, third, and so on spear head assemblies) can then be removed from the stringer 300 by sliding the spear head assemblies off the stringer. The spear head assemblies can be cleaned and used again.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more rings, spear head assemblies, etc., as the case may be, and does not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A gig comprising:
   a shaft;
   a spear head assembly comprising:
     a spear shaft;
     one or more spear prongs located at a first end of the spear shaft; and
     a ring, wherein the ring is directly secured to the spear shaft; and
   a stringer, wherein the stringer is removably or slidably connected to the ring.

2. The gig according to claim 1, wherein the shaft comprises a slot for removably receiving a second end of the spear shaft, and wherein the first end and the second end of the spear shaft are located opposite each other.

3. The gig according to claim 1, wherein the spear shaft comprises a first opening that traverses an entire width of the spear shaft, and wherein the ring is positioned within the first opening for directly securing the ring to the spear shaft.

4. The gig according to claim 3, wherein the first opening further comprises a crimp for crimping a first end and a second end of the ring together.

5. The gig according to claim 3, wherein the spear shaft further comprises a second opening located perpendicular to the first opening, and wherein the second opening traverses the spear shaft to conjoin with the first opening.

6. The gig according to claim 5, wherein the second opening receives a fastener for securing the ring to the spear shaft.

7. The gig according to claim 1, wherein the spear head assembly is a first spear head assembly, and wherein a first end of the stringer is removably secured to a first ring of the first spear head assembly.

8. The gig according to claim 7, wherein the gig further comprises at least a second spear head assembly, and wherein the at least second spear head assembly comprises a second ring, and wherein the stringer is slidably connected to the second ring.

9. The gig according to claim 8, wherein a second end of the stringer is removably secured to an anchor.

10. The gig according to claim 1, wherein the shaft and spear shaft have a cross-sectional shape selected from circular, square, rectangular, or triangular.

11. The gig according to claim 1, wherein the shaft, spear shaft, and the one or more spear prongs are made from a material selected from a metal, a metal alloy, or a rigid plastic.

12. The gig according to claim 1, wherein the ring is made from a flexible, semi-rigid, or rigid material selected from metals, metal alloys, or plastics.

13. A method for gigging comprising:
   inserting a second end of a spear shaft of a first spear head assembly into a slot of a shaft, wherein the first spear head assembly comprises: the spear shaft; one or more spear prongs located at a first end of the spear shaft; and a ring, wherein the ring is directly secured to the spear shaft;
   removably connecting a first end of a stringer to the ring and removably securing a second end of the stringer to an anchor;
   providing upward pull on the stringer to maintain the first spear head assembly within the slot of the shaft;
   thrusting the shaft and first spear head assembly towards a fish or amphibian;
   releasing the upward pull on the stringer whereby the first spear head assembly detaches from the shaft; and
   allowing the first spear head assembly to move within a body of water.

14. The method according to claim 13, further comprising slidably connecting the stringer to a ring of at least a second spear head assembly prior to removably connecting the first end of the stringer to the ring of the first spear head assembly.

15. The method according to claim 14, further comprising:

inserting a second end of a spear shaft of the second spear head assembly into the slot of the shaft, wherein the second spear head assembly comprises: the spear shaft; one or more spear prongs located at a first end of the spear shaft; and a ring, wherein the ring is secured to the spear shaft;

providing upward pull on the stringer to maintain the second spear head assembly within the slot of the shaft;

thrusting the shaft and second spear head assembly towards a fish or amphibian;

releasing the upward pull on the stringer whereby the second spear head assembly detaches from the shaft; and allowing the second spear head assembly to slide down the stringer and move within a body of water.

16. The method according to claim 13, wherein the spear shaft comprises a first opening that traverses an entire width of the spear shaft, and wherein the ring is positioned within the first opening for directly securing the ring to the spear shaft.

17. The method according to claim 16, wherein the first opening further comprises a crimp for crimping a first end and a second end of the ring together.

18. The method according to claim 16, wherein the spear shaft further comprises a second opening located perpendicular to the first opening, and wherein the second opening traverses the spear shaft to conjoin with the first opening.

19. The method according to claim 18, wherein the second opening receives a fastener for securing the ring to the spear shaft.

20. The gig according to claim 1, wherein the ring is located near a second end of the spear shaft.

* * * * *